US008619677B2

(12) United States Patent
Kim et al.

(10) Patent No.: US 8,619,677 B2
(45) Date of Patent: Dec. 31, 2013

(54) BASE STATION ANTENNA IN A MOBILE COMMUNICATION SYSTEM

(75) Inventors: Duk-Yong Kim, Gyeonggi-do (KR); In-Ho Kim, Gyeonggi-do (KR); Kang-Hyun Lee, Gyeonggi-do (KR); Oh-Seog Choi, Gyeonggi-do (KR); Seok Sung, Gyeonggi-do (KR); Jung-Pil Lee, Gyeonggi-do (KR); Young-Chan Moon, Gyeonggi-do (KR); Taek-Dong Kim, Gyeonggi-do (KR)

(73) Assignee: KMW Inc., Yongcheon-ri, Dongtan-myeon, Hwaseong-si, Gyeonggi-do (KR)

( * ) Notice: Subject to any disclaimer, the term of this patent is extended or adjusted under 35 U.S.C. 154(b) by 229 days.

(21) Appl. No.: 13/120,489

(22) PCT Filed: Sep. 28, 2009

(86) PCT No.: PCT/KR2009/005539

§ 371 (c)(1), (2), (4) Date: Mar. 23, 2011

(87) PCT Pub. No.: WO2010/036076

PCT Pub. Date: Apr. 1, 2010

(65) Prior Publication Data

US 2011/0176462 A1 Jul. 21, 2011

(30) Foreign Application Priority Data

Sep. 26, 2008 (KR) ........................ 10-2008-0094917
Nov. 7, 2008 (KR) ........................ 10-2008-0110702
Jan. 30, 2009 (KR) ........................ 10-2009-0007705
Apr. 20, 2009 (KR) ........................ 10-2009-0034398

(51) Int. Cl.
*H04W 4/00* (2009.01)
*H04J 1/00* (2006.01)

(52) U.S. Cl.
USPC ........................................... 370/328; 343/757

(58) Field of Classification Search
USPC ........................... 370/281, 328; 343/757, 853
See application file for complete search history.

(56) References Cited

U.S. PATENT DOCUMENTS

2004/0198451 A1* 10/2004 Varghese ................... 455/562.1
2006/0229048 A1* 10/2006 Carroll et al. ................. 455/268
2006/0244675 A1* 11/2006 Elliot et al. .................. 343/853
2007/0001919 A1* 1/2007 Carroll et al. ................. 343/757
2007/0135169 A1* 6/2007 Sychaleun et al. ......... 455/562.1
2007/0258432 A1* 11/2007 Lee et al. ...................... 370/347
2008/0107216 A1* 5/2008 Niemi ........................... 375/349
2008/0167076 A1 7/2008 Kim et al.
2008/0216663 A1* 9/2008 Williamson .................... 99/279
2008/0260388 A1* 10/2008 Kim et al. ..................... 398/115
2008/0287163 A1* 11/2008 Skarby et al. .............. 455/562.1

(Continued)

FOREIGN PATENT DOCUMENTS

JP 61-276402 A 12/1986
JP 03-196705 A 8/1991

(Continued)

*Primary Examiner* — Brian D Nguyen
(74) *Attorney, Agent, or Firm* — Cha & Reiter, LLC

(57) ABSTRACT

A Base Station (BS) antenna in a mobile communication system is provided, in which a reflective plate has a frontal surface onto which radiation elements are attached, and at least one protector is attached onto the reflective plate, surrounding at least part of the reflective plate.

20 Claims, 11 Drawing Sheets

(56) References Cited

U.S. PATENT DOCUMENTS

| | | | | |
|---|---|---|---|---|
| 2009/0061938 | A1* | 3/2009 | Ulbricht et al. | 455/561 |
| 2009/0066595 | A1* | 3/2009 | Barker et al. | 343/757 |
| 2009/0128433 | A1* | 5/2009 | Lawlor et al. | 343/757 |

FOREIGN PATENT DOCUMENTS

| | | | | |
|---|---|---|---|---|
| JP | 11-330841 | A | 11/1999 | |
| JP | 2000-078072 | | 3/2000 | H04B 7/26 |
| JP | 2000-503497 | A | 3/2000 | |
| JP | 2002-009526 | A | 1/2002 | |
| JP | 2004-336447 | A | 11/2004 | |
| JP | 2006-279900 | A | 10/2006 | |
| JP | 2007-013258 | A | 1/2007 | |
| JP | 2007-208680 | A | 8/2007 | |
| JP | 2007-243407 | A | 9/2007 | |
| JP | 2008-154257 | A | 7/2008 | |
| KR | 2005-69746 | | 7/2005 | H01Q 13/08 |
| WO | 02/069443 | A1 | 9/2002 | |
| WO | 2008/020178 | A1 | 2/2008 | |

* cited by examiner (a)

| | ANT | TMA | Total |
|---|---|---|---|
| NF (dB) | 1.50 | 2.00 | 3.50 |
| Gain (dB) | -1.50 | 14.50 | 13.00 |
| OIP3 (dBm) | 100.00 | 34.00 | 34.00 |
| OP1 dB (dBm) | | 20.00 | 20.00 |

(b)

| | Radiator | TDD Module | Phase Shifter + Divider | Total |
|---|---|---|---|---|
| NF (dB) | 0.00 | 1.80 | 1.50 | 1.84 |
| Gain (dB) | 0.00 | 14.50 | -1.50 | 13.00 |
| OIP3 (dBm) | 100.00 | 34.00 | 100.00 | 32.50 |
| OP1 dB (dBm) | | 20.00 | | 18.50 |

BASE STATION ANTENNA IN A MOBILE COMMUNICATION SYSTEM

This application is a national phase of PCT/KR2009/005539 filed on Sep. 28, 2009 which in turn claims all benefits from applications filed in the Korean Intellectual Property Office on Sep. 26, 2008 and there duly assigned Serial No. 10-2008-0094917; filed on Nov. 7, 2008 and there duly assigned Serial No. 10-2008-0110702; filed on Jan.30, 2009 and there duly assigned Serial No. 10-2009-0007705; and Apr. 20, 2009 and there duly assigned Serial No. 10-2009-0034398, the content of which are herein incorporated by reference

TECHNICAL FIELD

The present invention relates to a Base Station (BS) antenna in a mobile communication system.

BACKGROUND ART

Generally, in a mobile communication BS system, a BS amplifies a transmission signal through a high-power amplifier, transmits the amplified signal to an antenna via a feeder cable, and radiates the signal through the antenna. The antenna receives a signal and transmits the received signal to a Low Noise Amplifier (LNA) in the BS through the feeder cable. The LNA amplifies a weak received signal. For the purpose of providing a service, the antenna is mounted on a high place such as a rooftop or a tower and a Base Transceiver Station (BTS) is installed within a building or under a tower. Hence, a long transmission line is established between the BTS and the antenna.

The long signal transmission line between the BTS and the antenna causes a great signal loss during transmission of a transmission signal and a reception signal via the feeder cable. Especially when the distance between the BTS and the antenna is tens of meters, a 3-dB or more loss of an input signal is brought when a link budget is calculated. The signal loss leads to coverage reduction caused by decreased transmit power and the decrease of reception sensitivity caused by a poor reception Noise Figure (NF).

Owing to the recent technological development and cost reduction of transmission power amplifiers, the problem of decreased transmit power can be solved by increasing the output capacity of the power amplifiers. Although the reception sensitivity decrease can be overcome by increasing the output of a Mobile Station (MS), the battery lifetime of the MS may be dropped.

In this context, studies are made on methods for improving the reception NF without imposing constraints on the MS. Among them, a current popular method is that a Tower Mounted Amplifier (TMA) 2 is connected to an antenna 1 in the vicinity of the antenna 1 as shown in FIG. 1, to thereby compensate for NF degradation caused by the loss of the feeder cable. For a related technology, refer to Korean Patent Application No. 2004-16163 entitled "Detachable Tower Mounted Amplifier Directly Connected to Antenna" invented by Deok-Yong Kim, et. al. and filed by the same applicant on Mar. 10, 2005.

The above method has limitations in its effectiveness in overcoming the degradation of a reception NF caused by signal loss in a feeding circuit. Since the TMA 2 amplifies a signal received from each radiation element at one amplifier, a defect in the amplifier causes a rapid degradation in the NF of a received signal as the defective amplifier is usually bypassed. Moreover, a switch for distinguishing transmission from reception in Time Division Duplex (TDD) should have a capacity corresponding to high transmit power.

DISCLOSURE OF INVENTION

Technical Problem

An aspect of exemplary embodiments of the present invention is to address at least the problems and/or disadvantages and to provide at least the advantages described below. Accordingly, an aspect of exemplary embodiments of the present invention is to provide a BS antenna for minimizing loss caused by a feeding circuit of the antenna and signal separation in a mobile communication system.

Another aspect of exemplary embodiments of the present invention is to provide a BS antenna for handling the risk of fatal reception performance degradation by maintaining a reception level to be relatively stable in a mobile communication system.

A further aspect of exemplary embodiments of the present invention is to provide a BS antenna adopting a switch with a capacity corresponding to low power as a TDD switch for distinguishing transmission from reception in a mobile communication system.

Solution to Problem

In accordance with an aspect of exemplary embodiments of the present invention, there is provided a BS antenna in a mobile communication system, in which a reflective plate has a frontal surface onto which radiation elements are attached, and at least one protector is attached onto the reflective plate, surrounding at least part of the reflective plate.

Advantageous Effects of Invention

As is apparent from the above description, a BS antenna for a mobile communication system according to the present invention has the following effects. Firstly, since amplifiers are distributed and directly connected to radiation elements, an NF that might be degraded by a feeding circuit within an antenna can be minimized. The resulting improved uplink throughput decreases a retransmission rate, thereby improving downlink throughput. Because a received signal is amplified separately in a plurality of amplifiers, a rapid drop in reception level is prevented in spite of an error in any of the amplifiers. Secondly, loss is reduced since an RF signal and a control signal received from a BTS are separated once within the antenna. Thirdly, a TDD switch switches a transmission signal divided on a radiation element basis. Hence, a switch that performs in correspondence with low power can be used. Fourthly, a relatively low power transistor with a low 1-dB Compression Point (CP) can be used for an amplifier. Fifthly, the isolation specification requirement of the TDD switch can be alleviated. Sixthly, use of a plurality of low-power amplifiers reduces the probability of amplifier malfunction caused by an external interference signal.

BRIEF DESCRIPTION OF DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

MODE FOR THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 2:
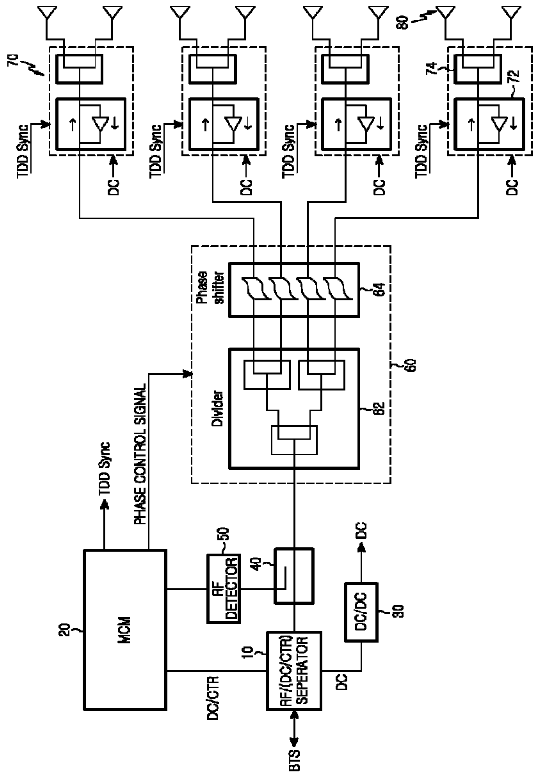
FIG. 2 is an overall block diagram of a BS antenna in a Time Division Duplex (TDD) mobile communication system according to an exemplary embodiment of the present invention.

FIG. 2 is an overall block diagram of a Base Station (BS) antenna in a Time Division Duplex (TDD) mobile communication system according to an exemplary embodiment of the present invention.

Referring to FIG. 2, the BS antenna of the present invention is basically configured so as to be connected directly to a Base Transceiver Station (BTS), without the conventional Tower Mounted Amplifier (TMA). The BS antenna includes a signal separator (or an RF/(DC/CTR) separator in FIG. 2) 10 with a bias-T, for separating an RF signal, a control signal for antenna control, and DC power from the BTS, and a division/phase shift module 60 for primarily dividing the RF signal received from the RF/(DC/CTR) separator 10 at 1:N (1:4 in FIG. 2) through a divider 62 and shifting the phase of each of the divided signals through a phase shifter 64 according to a phase control signal.

The BS antenna is further provided with at least one reception signal amplification/division module 70 having at least one reception signal amplifier 72 for receiving a transmission downlink signal from the division/phase shift module 60, transmitting the downlink signal to at least one radiation element 80 according to a transmission/reception switching control signal, i.e. a TDD synchronization signal TDD Sync, filtering an uplink signal received from the at least one radiation element 80 in a predetermined reception band, and amplifying the filtered uplink signal at a Low Noise Amplifier (LNA), and at least one antenna-front end divider 74 at the front end of the at least one radiation element, for secondarily dividing the signal received from the at least one signal amplifier 72 at 1:M (1:2 in FIG. 2) and outputting each of the divided signals to the associated radiation element 80. A final division ratio determined based on the division ratio 1:N in the divider 62 of the division/phase shift module 60 and the division ratio 1:M in the antenna front-end divider 74 of the reception signal amplification/division module 70 depends on the number of radiation elements of the BS antenna.

The BS antenna also includes an RF coupler 40 for generating a signal coupled with an RF signal in an RF path between the signal separator 10 and the division/phase shift module 60, an RF detector 50 for detecting the RF signal from the coupled signal, and a DC/DC converter 30 for receiving the DC power from the signal separator 10 and supplying an operation power to the LNA of each reception signal amplification/division module 70.

The BS antenna further has a Main Control Module (MCM) 20 for receiving the control signal and the DC power from the signal separator 10, analyzing the status of the RF signal detected by the RF detector 50, outputting a phase control signal to the phase shifter 64 of the division/phase shift module 60 accordingly, and outputting the TDD synchronization signal TDD Sync to the reception signal amplification/division module 70.

A big difference between the conventional BS antenna and the BS antenna having the above configuration according to the present invention is the reception signal amplification/division modules 70 in the vicinity of each of the radiation elements 80, for amplifying signals received from the radiation elements 80 almost immediately without loss on a transmission line. Since the reception signal amplification modules are distributed and connected directly to the radiation elements, signal loss caused by a feeding circuit within the BS antenna is minimized. In addition, a received signal is amplified by a plurality of amplifiers in a distributed manner, rather than by a single amplifier. As a result, a rapid drop in reception level is prevented despite an error in one of the amplifiers. As a divided transmission signal is switched on a radiation element basis, a switch with a capacity corresponding to a low power can be used and the isolation specification requirement of the switch can be alleviated.

Figure 3:
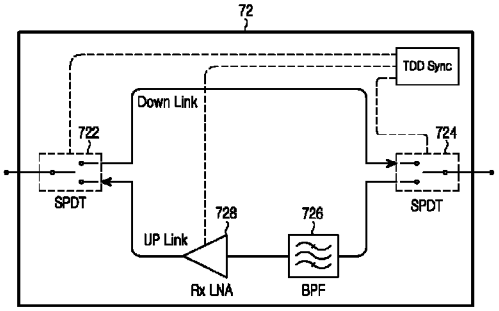
FIG. 3 is a detailed block diagram of a reception signal amplifier illustrated in FIG. 2 according to an exemplary embodiment of the present invention.

FIG. 3 is a detailed block diagram of a reception signal amplifier of a reception signal amplification/division module illustrated in FIG. 2 according to an exemplary embodiment of the present invention.

Referring to FIG. 3, the reception signal amplifier 72 includes a first switch 722 connected to the division/phase shift module 60, for switching a transmission/reception path according to the TDD synchronization signal TDD Sync, a second switch 724 connected to the radiation element 80, for switching the transmission/reception path according to the TDD synchronization signal TDD Sync, a Band Pass Filter (BPF) 726 for passing only a signal of a predetermined reception band in a signal received from the second switch 724 during reception, and an LNA 728 for low-noise-amplifying the signal received from the BPF 726.

During RF transmission in the reception signal amplifier 72, the first and second switches 722 and 724 switch to the transmission path according to the TDD synchronization signal TDD Sync and thus a transmission signal is transmitted to the radiation element 80 through the first and second switches 722 and 724.

During RF reception, the first and second switches 722 and 724 switch to the reception path according to the TDD synchronization signal TDD Sync and thus a signal received from the radiation element 80 is provided to the BPF 726 through the second switch 724. The BPF 726 filters only a signal in the predetermined reception frequency band from the received signal. The LNA 728 low-noise-amplifies the filtered signal and provides the amplified signal on an uplink to the BTS through the first switch 722.

As described above, because a signal received through the radiation element 80 is amplified at the nearby LNA 728 connected to the radiation element 80, signal loss is minimized. Compared to the conventional BS antenna, since the received signal is amplified before it is added with noise in the transmission path of the antenna, the amplification efficiency of a valid signal is further increased. In addition, signal loss can be minimized during signal transmission because there is no particular device on the transmission path.

Figure 4:
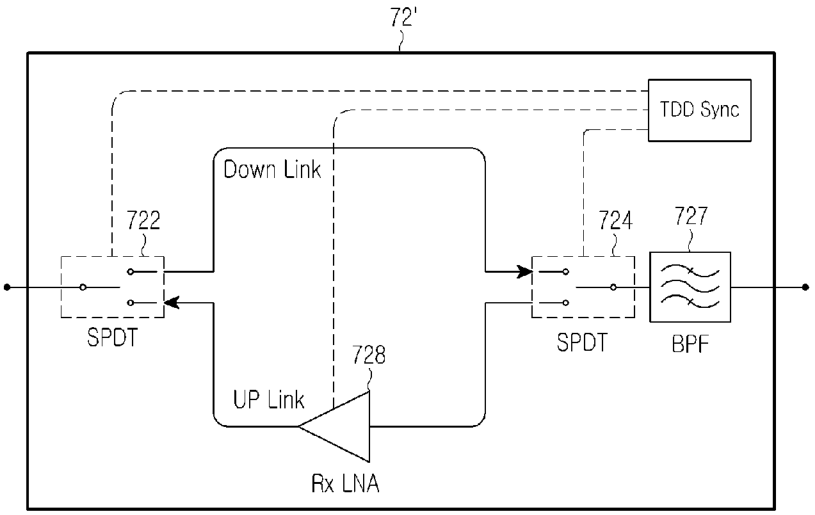
FIG. 4 is a detailed block diagram of a reception signal amplifier illustrated in FIG. 2 according to another exemplary embodiment of the present invention.

FIG. 4 is a detailed block diagram of a reception signal amplifier illustrated in FIG. 2 according to another exemplary embodiment of the present invention. A reception signal amplifier 72' illustrated in FIG. 4 is similar to the reception signal amplifier 72 illustrated in FIG. 3 in terms of configuration, except that a transmission/reception BPF 727 is provided between the second switch 724 and the radiation element 80. The configuration of the reception signal amplifier 72' improves spurious emission because a transmission signal passes through the BPF 727.

Figure 1:
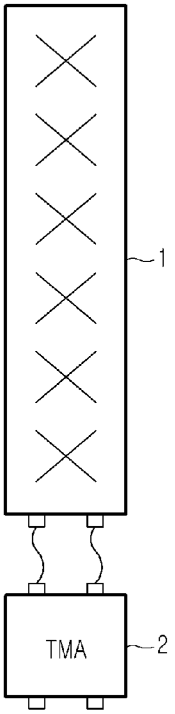
FIG. 1 illustrates a conventional BS antenna system with a TMA.
Figure 5:
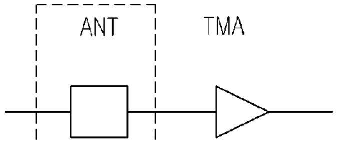
FIG. 5 illustrates the results of simulating the signal loss of the BS antenna of the present invention and the conventional BS antenna.
Figure 5:
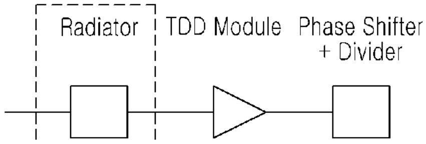

FIG. 5 illustrates the results of simulating the signal loss of the BS antenna of the present invention and the conventional BS antenna. Specifically, FIG. 5(*a*) illustrates a Noise Figure (NF) simulation of a conventional BS antenna, for example, the BS antenna illustrated in FIG. 1 and FIG. 5(*b*) illustrates an NF simulation of the BS antenna of the present invention.

A typical BS antenna for mobile communication is elongated as a plurality of radiation elements are vertically arranged in view of the nature of a service. Consequently, a feeding circuit for transmitting a signal to each radiation element is extended in length, thus causing power supply loss. A recently widespread Electric DownTilt Antenna (EDTA) usually has an efficiency of about 70% and experiences a 30% NF degradation, i.e. a 1.5-dB NF degradation due to signal loss caused by the feeding circuit, as illustrated in FIG. 5(*a*). As noted from FIG. 5(*a*), an additional about 2-dB NF degradation occurs in the TMA. In contrast, the BS antenna of the present invention has a total NF of 1.84 dB, improved by 1.66 dB, as illustrated in FIG. 5(*b*). The reason for calculating the NF of a TDD module to be 1.8 dB is to improve the 0.2-dB insertion loss caused by a jumper cable between the antenna and the TMA.

Figure 6:
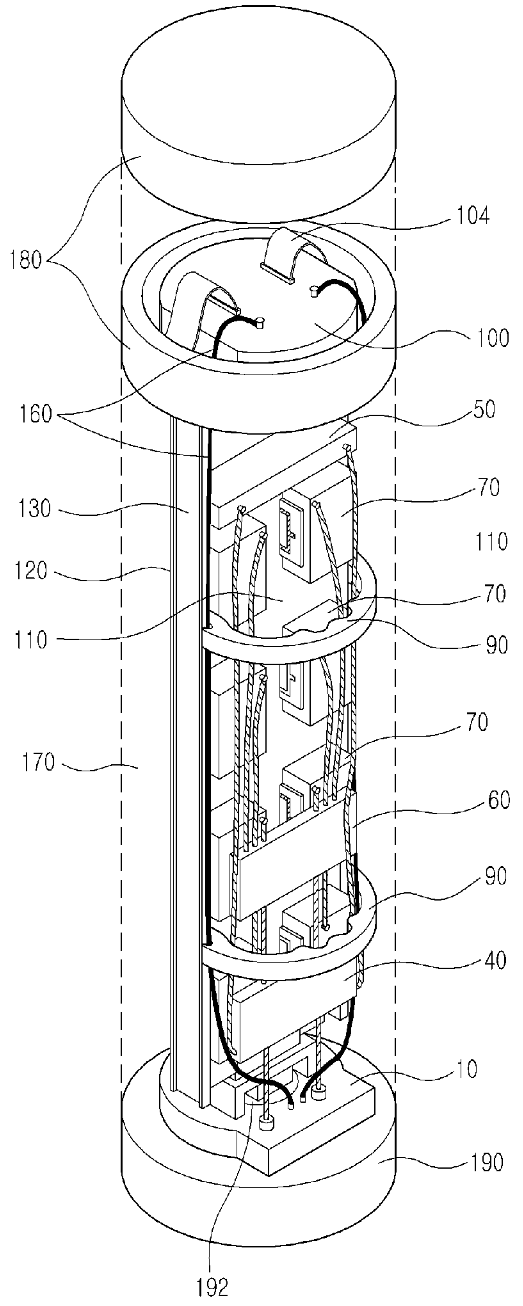
FIG. 6 is a perspective view of the overall configuration of a BS antenna in a mobile communication system according to an exemplary embodiment of the present invention.
Figure 7:
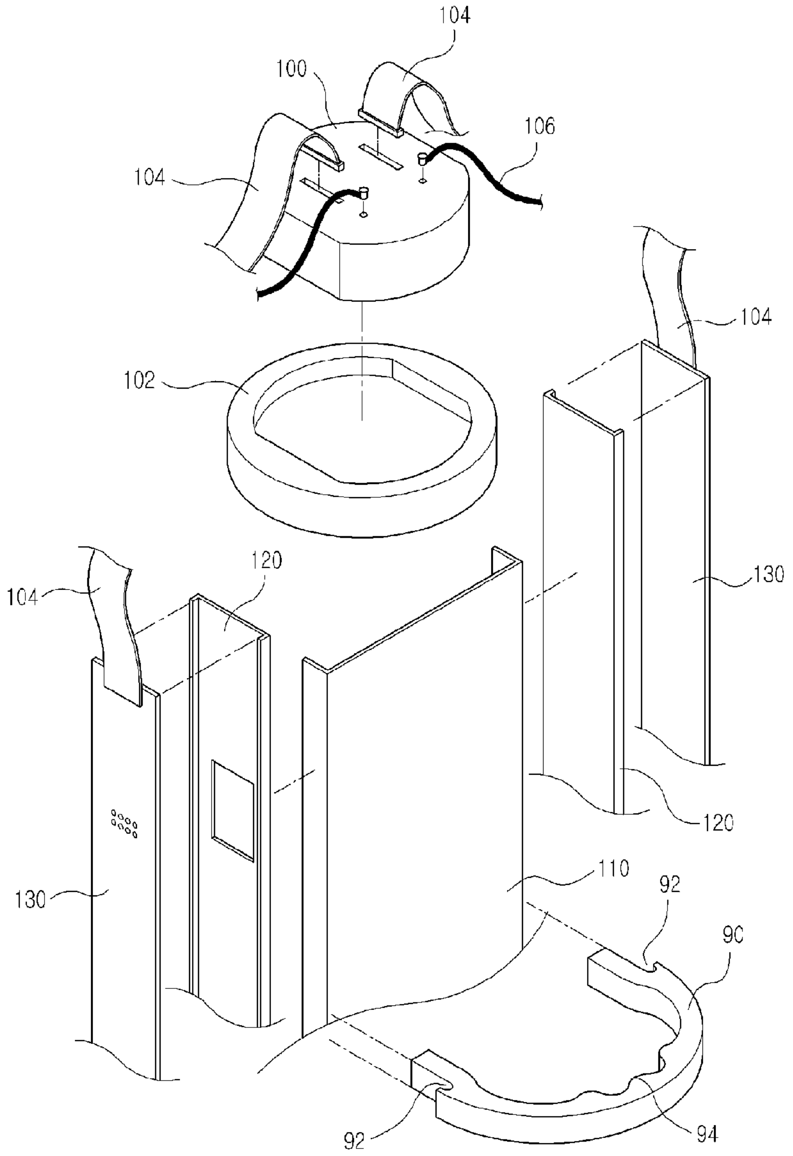
FIG. 7 is a detailed exploded perspective view of important parts illustrated in FIG. 6.

FIG. 6 is a perspective view of the overall configuration of a BS antenna in a mobile communication system according to an exemplary embodiment of the present invention and FIG. 7 is a detailed exploded perspective view of important parts illustrated in FIG. 6. In FIGS. 6 and 7, an exemplary mechanical configuration of the BS antenna according to the present invention is illustrated. With respect to the rear surface of a reflective plate 110, the interior mechanical structure of the BS antenna is illustrated. For the convenience' sake, the surface of the reflective plate 110 on which radiation elements are mounted is referred to as the front surface of the reflective plate 110. Like reference numerals denote the same components in FIGS. 2 and 6.

Referring to FIGS. 6 and 7, the BS antenna of the present invention is mechanically configured such that a raydome 170 of which the top and bottom are capped with upper and lower caps 180 and 190 forms the exterior of the BS antenna and a plurality of devices including radiation elements (not shown) are installed inside. A plurality of reception signal amplification/division modules 70 are installed on the rear surface of the reflective plate 110 in direct connection to (connectors of) the radiation elements on the front surface of the reflective plate 110 according to the present invention.

The signal separator 10 is mounted in the lower cap 190 connected to the BTS and the RF coupler 40 and the division/phase shift module 60 are installed sequentially above the signal separator 10. The RF detector 50 is installed at an upper portion of the rear surface of the reflective plate 110 and an MCM assembly 100 is in the upper cap 180.

A rotator 192 having a driving motor and a rotation gear is installed in the vicinity of the signal separator 10 at a lower portion of the reflective plate 110, for left/right rotating the reflective plate 110 under the control of the MCM assembly 100. As the reflective plate 110 rotates along with the rotation of the rotator 192, the radiation direction of antenna beams is adjusted.

Meanwhile, it is noted from FIG. 6 that transmission lines are connected in the form of cables among the signal separator 10, the RF coupler 40, the division/phase shift module 60, the RF detector 50, and the MCM assembly 100. For example, a transmission line 106 marked in a solid line between the signal separator 10 and the MCM assembly 100 is used to provide a control signal and a DC power separated by the signal separator 10 to the MCM assembly 100.

A plurality of protectors 90 are attached onto the reflective plate 110, at least partially surrounding the reflective plate 110 in order to prevent collision between the reflective plate 110 and the raydome 170 when the reflective plate 110 rotates inside the raydome 170. These protectors 90 may be attached onto the rear surface of the reflective plate 110 to protect a plurality of devices that can be attachable onto the rear surface of the reflective plate, inclusive of the reception signal amplification/division modules 70. The protectors 90 may be formed of a material with a predetermined dielectric constant, for example, plastic and used for improving RF characteristics.

Each of these protectors 90 may be shaped into, for example, a semi-circular bar and attached firmly to the reflective plate 110, so that a user can carry the whole antenna reflective plate 110 (and the plurality of devices attached onto it) with a protector 90. The protectors 90 are semi-circular in correspondence with an inner circumferential surface of the raydome 170.

To facilitate the user to carry the reflective plate 110 by the protectors 90, the protectors 90 may have sleep-proof structures 94 each having rugged grooves and/or protrusions. The protectors 90 having this configuration serve to protect the devices inside during moving or installing the assembled BS antenna, and to enable easy conveyance of the half-assembled BS antenna during the manufacturing process. Since the protectors 90 obviate the need for the user's contact with the reflective plate or other devices, the risk of damaging the reflective plate or other devices is further reduced.

The protectors 90 each may be provided with cable guide structures 94 having grooves or holes for guiding at least part of a plurality of cables including a power supply transmission line inside the antenna. That is, a cable may be inserted in a groove or a hole of a cable guide structure 94.

In the antenna having the above-described mechanical structure, the MCM assembly 100 is fixed to the reflective plate 110. As illustrated in FIG. 7, the MCM assembly 100 may be fixed to the reflective plate, with a mounting guide structure 102 installed. The MCM assembly 100 may be configured to have an independent housing in order to facilitate repair and maintenance of the MCM assembly 100. The top of the upper cap 180 is designed in the form of a cover that is easily opened and closed, so that the MCM assembly 100 is readily mounted or detached. Because the MCM assembly 100 generally includes rather complex electronic circuits, it is vulnerable to breakage, relative to other internal components of the antenna. The detachable structure of the MCM assembly 100 facilitates replacement of the MCM assembly 100, which in turn makes repair and maintenance of the whole antenna easy. Especially when the MCM assembly 100 is detached, the reception signal amplification/division modules 70 are bypassed without affecting the basic antenna functionality, that is, transmission and reception. Thus, a mobile communication service is not interrupted.

Transmission lines through which the MCM assembly 100 transmits the phase control signal and the TDD synchronization signal TDD Sync to the division/phase shift module 60 and each reception signal amplification/division module 70 are provided on a transmission line printed board 130 using a Printed Circuit Board (PCB) such as a multi-layer board according to the present invention. The transmission line printed board 130 may be attached to a side surface of the reflective plate 110 directly, or using a board guide panel 120 according to the embodiment of the present invention. A final connection can be made between the transmission line printed board 130 and the MCM assembly 100 by a flat cable (or ribbon cable) having a multi-line connector such as an Insulation Displacement Connector (IDC) at an end thereof or a multi-line cable 104 such as a Flexible PCB (FPCB). This structure further facilitates mounting and detachment of the MCM assembly 100. Needless to say, a transmission line 106 in which the control signal and the DC power are transferred from the signal separator 10 to the MCM assembly 100 has a connector shaped into a jack.

Because transmission lines in which control signals are transferred from the MCM assembly 100 are formed by use of the transmission line printed board 130, the complexity of transmission lines is reduced, fabrication and processing are facilitated, and design freedom is increased, compared to individual formation of transmission lines.

The reason for fixing the MCM assembly 100 onto the reflective plate 110 is to prevent damage which is caused by entanglement between the MCM assembly 100 and transmission lines when the MCM assembly 100 rotates together with the reflective plate 110 rotated by the rotator 192. If a rotary joint and a slip ring are used conventionally, cost increases and reliability is impaired.

Figure 8:
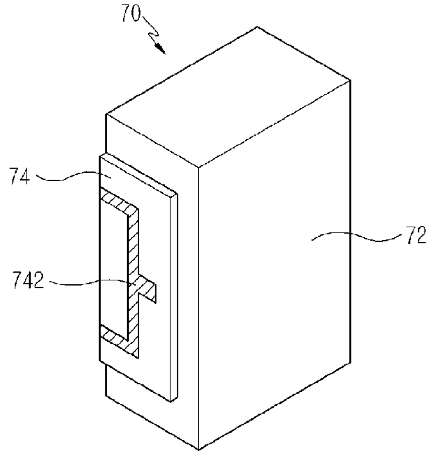
FIG. 8 is an exterior perspective view of a reception signal amplification/division module illustrated in FIG. 6.

FIG. 8 is an exterior perspective view of a reception signal amplification/division module 70 illustrated in FIG. 6.

Referring to FIG. 8, the antenna front-end divider 74 is configured in the form of a PCB and attached to a portion of the reception signal amplifier 72 in the reception signal amplification/division module 70. A transmission line pattern of a divider with a division ratio of 1:2, for example, may be formed as the antenna-front end divider 74. The transmission line pattern for the antenna-front end divider 74 is designed such that both ends of its branches are at positions corresponding to connectors of radiation elements and its joining portion is connected to, for example, a connector of the second switch (724 in FIG. 2) or the BPF (727 in FIG. 4) within the reception signal amplifier 72. The structure of the reception signal amplification/division module 70 extremely reduces the length of the transmission line that may cause signal loss. Thus, it is an optimal structure in terms of preventing signal loss.

Figure 9:
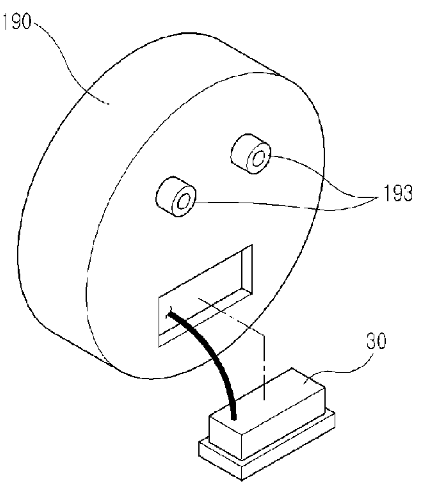
FIG. 9 is a detailed perspective view of a lower cap illustrated in FIG. 6.

FIG. 9 is a detailed perspective view of the lower cap illustrated in FIG. 6. Referring to FIG. 9, the lower cap 190 is provided, on the bottom surface thereof, with connectors 193 to be connected to connection cables of the BTS. According to the present invention, especially a square hole is formed at a portion of the bottom surface of the lower cap 190. The DC/DC converter 30 is detachably mounted in the square hole by a screw or in any other manner in order to facilitate its maintenance and repair, like the installation structure of the MCM assembly 100.

Figure 10:
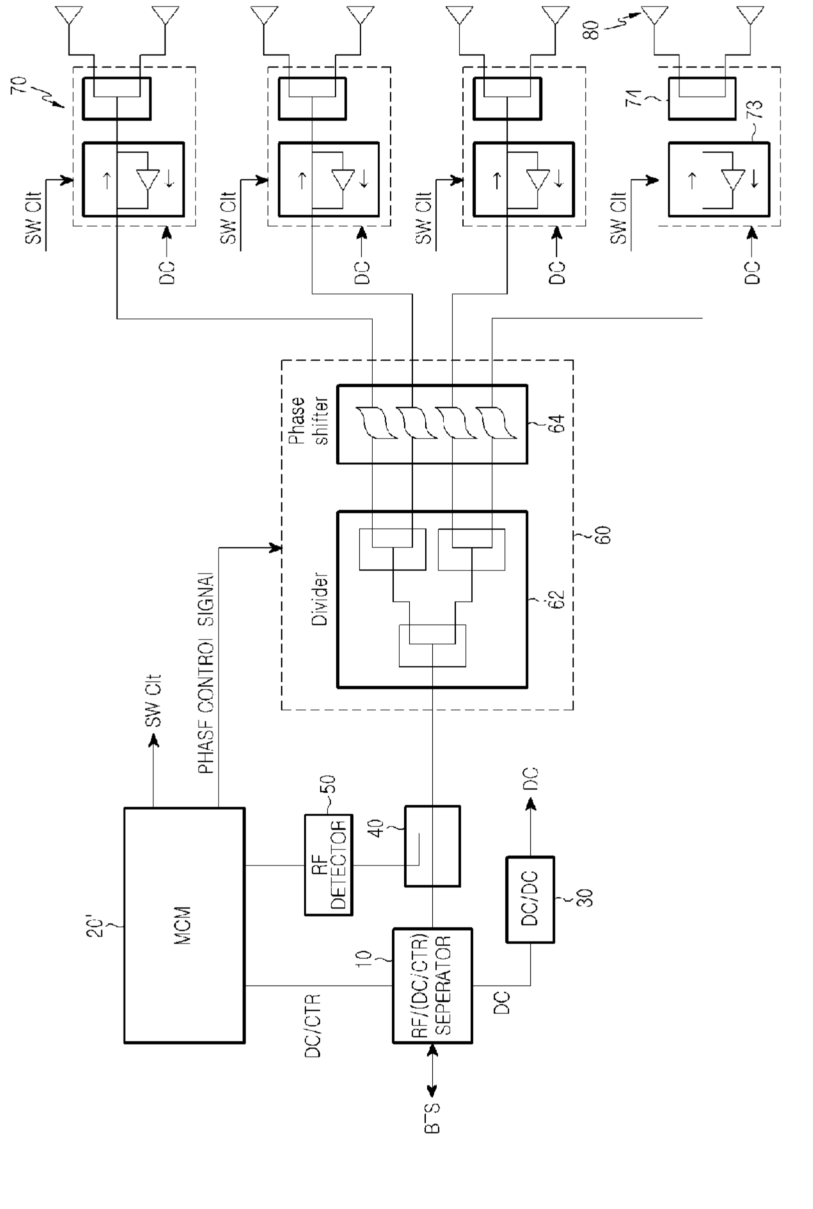
FIG. 10 is an overall block diagram of a BS antenna in a Frequency Division Duplex (FDD) mobile communication system according to another exemplary embodiment of the present invention.

FIG. 10 is an overall block diagram of a BS antenna in a Frequency Division Duplex (FDD) mobile communication system according to another exemplary embodiment of the present invention.

Referring to FIG. 10, the BS antenna is basically similar to the BS antenna illustrated in FIG. 2 in configuration, except that the former is applied to an FDD system and the latter is applied to a TDD system.

More specifically, like the configuration of the BS antenna illustrated in FIG. 2, the BS antenna illustrated in FIG. 10 includes the signal separator (or an RF/(DC/CTR) separator in FIG. 10) 10 for separating an RF signal, a control signal for antenna control, and DC power received from the BTS, and the division/phase shift module 60 for primarily dividing the RF signal received from the RF/(DC/CTR) separator 10 at 1:N (1:4 in FIG. 10) through the divider 62 and shifting the phase of each of the divided signals through the phase shifter 64 according to a phase control signal.

A reception signal amplification/division module 70' includes at least one reception signal amplifier 73 for separating a downlink signal from an uplink signal in FDD, transmitting the downlink transmission signal to at least one radiation element 80, and amplifying the uplink signal received from the at least one radiation element 80 at an LNA. The reception signal amplification/division module 70' is further provided with at least one antenna-front end divider 74 for secondarily dividing the signal received from the at least one signal amplifier 72 at 1:M (1:2 in FIG. 10), and outputting each of the divided signals to the associated radiation element 80. The operation status of the reception signal amplification/division module 70' may be controlled by a switching control signal SW Clt as described later.

Like the BS antenna illustrated in FIG. 2, the BS antenna illustrated in FIG. 10 is further provided with the DC/DC converter 30 for receiving the DC power from the signal separator 10 and supplying an operation power to the LNA of the reception signal amplification/division module 70', the RF coupler 40 for generating a signal coupled with an RF signal in an RF path between the signal separator 10 and the division/phase shift module 60, the RF detector 50 for detecting the RF signal from the coupled signal, and an MCM 20' for receiving the control signal and the DC power from the signal separator 10, analyzing the status of the RF signal detected by the RF detector 50, outputting a phase control signal to the phase shifter 64 of the division/phase shift module 60 accordingly, and outputting the switching control signal SW Clt to the reception signal amplification/division module 70'.

Figure 11:
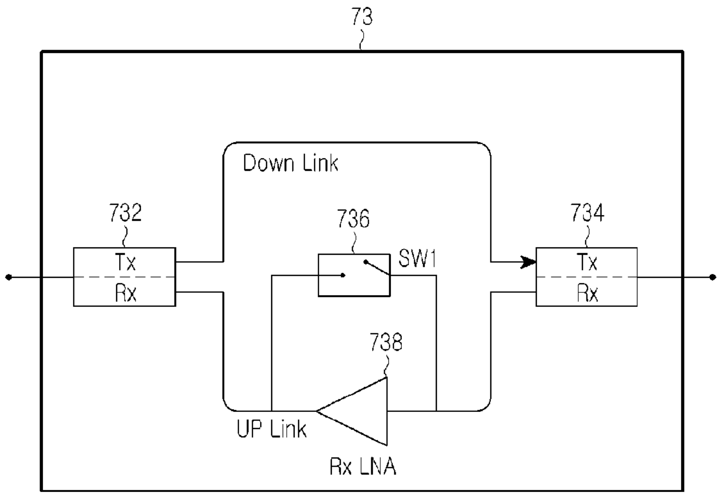
FIG. 11 is a detailed block diagram of a reception signal amplifier illustrated in FIG. 10 according to an exemplary embodiment of the present invention.

FIG. 11 is a detailed block diagram of the reception signal amplifier 73 of the reception signal amplification/division module 70' illustrated in FIG. 10 according to an exemplary embodiment of the present invention.

Referring to FIG. 11, the reception signal amplifier 73 includes first and second duplexers 732 and 734 for separating a transmission path from a reception path. There is an LNA 738 in the reception path between the duplexers 732 and 734. The reception signal amplification/division module 70' may be provided with a first switch 736 connected to the LNA 738 in parallel, for forming a bypass path in case of malfunction of the LNA 738. The MCM 20' provides a switching control signal SW Clt for bypassing to the first switch 736 of the reception signal amplifier 73, when the LNA 738 malfunctions.

In the reception signal amplifier 73, a transmission signal is transmitted to a radiation element 80 through the first and second duplexers 732 and 734. Meanwhile, the LNA 738 receives a signal through each radiation element 80 and low-noise amplifies the received signal. Then the amplified signal is transmitted on the uplink to the BTS through the first duplexer 732.

Figure 12:
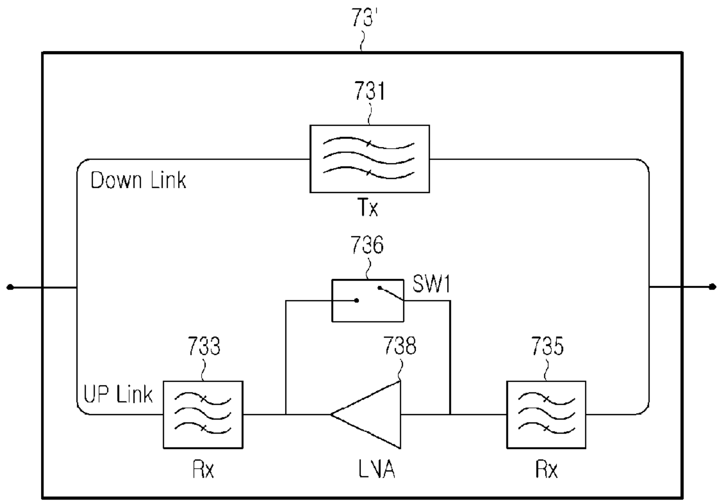
FIG. 12 is a detailed block diagram of the reception signal amplifier illustrated in FIG. 10 according to another exemplary embodiment of the present invention.

FIG. 12 is a detailed block diagram of the reception signal amplifier illustrated in FIG. 10 according to another exemplary embodiment of the present invention. A reception signal amplifier 73' illustrated in FIG. 12 is similar to the reception signal amplifier illustrated in FIG. 11 in terms of configuration, except that a Transmission (Tx) filter 731 and Reception (Rx) filters 733 and 735 are provided in the transmission and reception paths, respectively, instead of duplexers. That is, the Tx filter 731 resides in the transmission path and the LNA 738 and the first switch 736 are interposed between the first and second RX filters 733 and 735.

Figure 13:
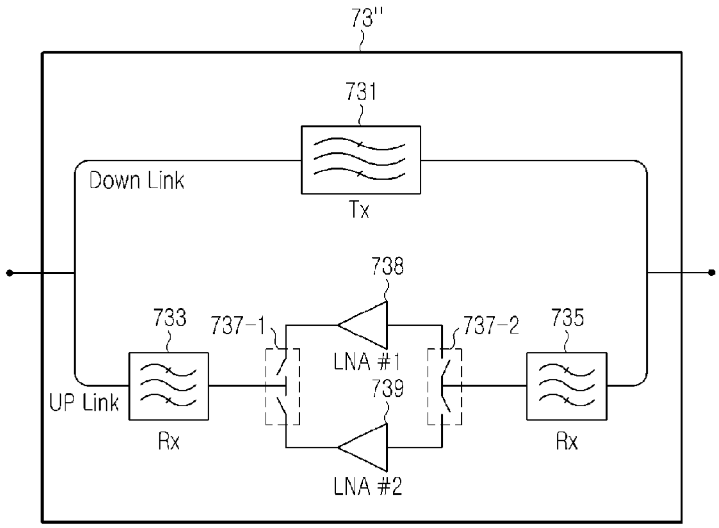
FIG. 13 is a detailed block diagram of the reception signal amplifier illustrated in FIG. 10 according to another exemplary embodiment of the present invention.

FIG. 13 is a detailed block diagram of the reception signal amplifier illustrated in FIG. 10 according to another exemplary embodiment of the present invention. A reception signal amplifier 73" illustrated in FIG. 13 is similar to the reception signal amplifier illustrated in FIG. 12 in terms of configuration, except that it has an auxiliary LNA 739 for redundancy in parallel to the LNA 738, instead of the first switch for bypassing. Second and third switches 737-1 and 737-2 may be provided to establish paths between the main LNA 738 and the auxiliary LNA 739 and the MCM 20' provides a switching control signal to the second and third switches 737-1 and 737-2.

Figure 14:
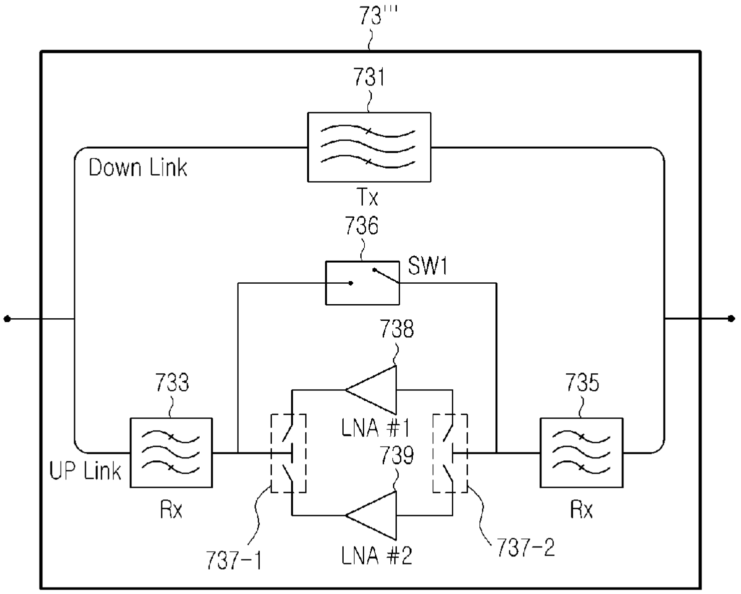
FIG. 14 is a detailed block diagram of the reception signal amplifier illustrated in FIG. 10 according to a further exemplary embodiment of the present invention.

FIG. 14 is a detailed block diagram of the reception signal amplifier illustrated in FIG. 10 according to a further exemplary embodiment of the present invention. A reception signal amplifier 73" illustrated in FIG. 14 is similar to the reception signal amplifier illustrated in FIG. 13 in terms of configuration, except that it has the first switch 736 for bypassing illustrated in FIG. 12 in addition to the structure illustrated in FIG. 13. The configuration of the reception signal amplifier 73" bypasses a received signal through the first switch 736 when both the main LNA 738 and the auxiliary LNA 739 are out of order. In this case, the MCM 20' provides switching control signals to the second and third switches 737-1 and 737-2 to establish paths between the main LNA 738 and the auxiliary LNA 739 and to the first switch 736 for bypassing.

Figure 15:
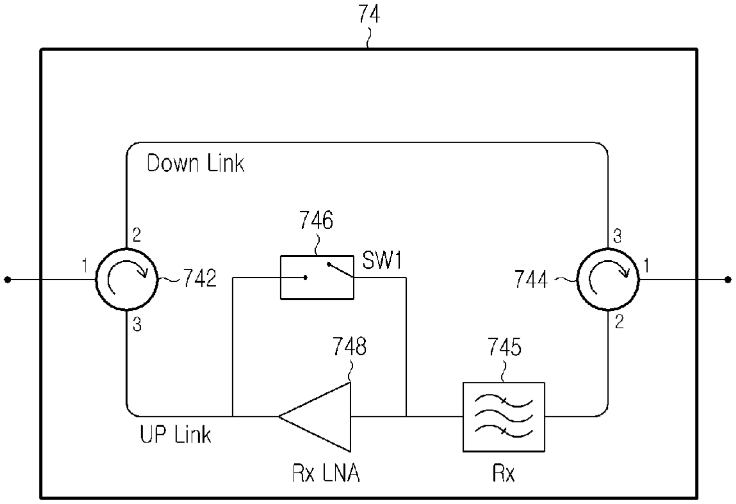
FIG. 15 is a block diagram of a reception signal amplifier applicable to the reception signal amplification/division modules illustrated in FIGS. 2 and 10 according to another exemplary embodiment of the present invention.

FIG. 15 is a block diagram of a reception signal amplifier applicable to the reception signal amplification/division modules illustrated in FIGS. 2 and 10 according to another exemplary embodiment of the present invention.

Referring to FIG. 15, the reception signal amplifier 74 is configured to be applicable commonly to the TDD system illustrated in FIG. 2 and the FDD system illustrated in FIG. 10. The reception signal amplifier 74 establishes transmission and reception paths using circulators.

Specifically, the reception signal amplifier 74 is provided with first and second circulators 742 and 744 to separate the transmission path from the reception path. The first circulator 742 is connected to the division/phase shift module 60 and the second circulator 744 is connected to a radiation element 80. There are a BPF 745 for passing only a predetermined frequency band and an LNA 748 for amplifying a received signal filtered by the BPF 745 in the reception path between the first and second circulators 742 and 744. The first switch 746 may be provided in parallel connection to the LNA 748, for establishing a bypass path in case of malfunction of the LNA 748 in the reception signal amplifier 74. The MCM 20 or 20' may provide a switching control signal to the first switch 746. When the LNA 748 malfunctions, the MCM 20 or 20' is configured so as to provide a switching control signal SW Clt for bypassing to the first switch 746 of the reception signal amplifier 74.

For RF transmission in the reception signal amplifier 74, the first circulator 742 receives a transmission signal through its first port and outputs the transmission signal through its second port. Then the second circulator 744 receives the transmission signal through its third port and outputs it to the radiation element 80 through its first port.

For RF reception, the second circulator 744 receives a signal through its first port and outputs it through its second port. Then the LNA 748 amplifies the received signal. The first circulator 742 receives the amplified signal through its third port and outputs it on the uplink to the BTS through its first port.

Figure 16:
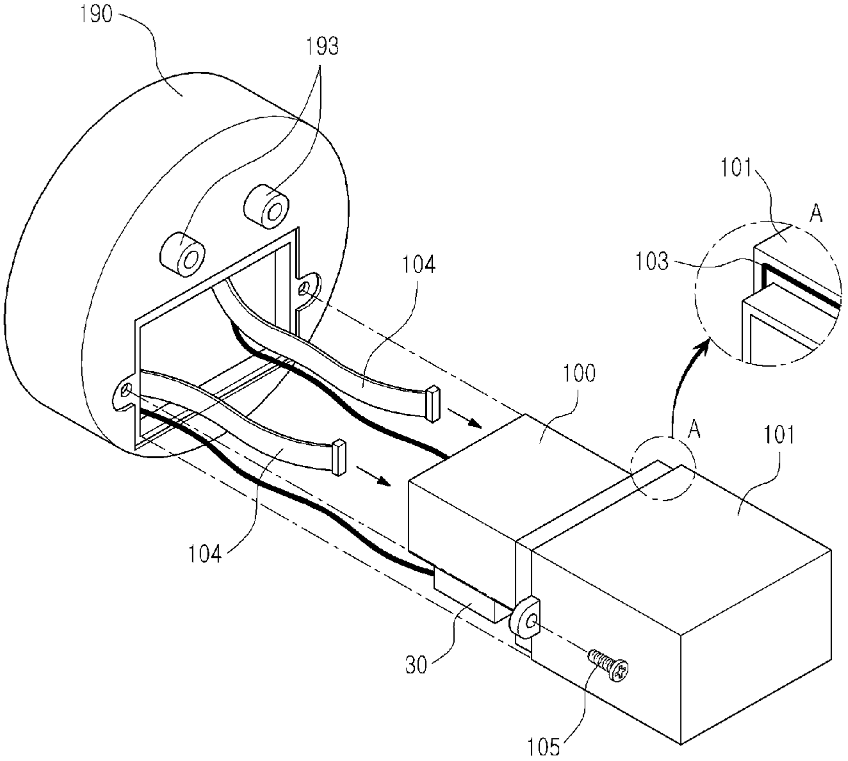
FIG. 16 is a detailed perspective view of the lower cap according to another exemplary embodiment of the present invention.

FIG. 16 is a detailed perspective view of the lower cap according to another exemplary embodiment of the present invention. Referring to FIG. 16, the MCM assembly 100 is mounted on the lower cap 190 instead of the upper cap 180. Specifically, the connectors 193 are formed on the lower surface of the lower cap 190, to be connected to the connection cables of the BTS. In addition, a box-type container 101 is attached within the lower cap 190, for detachably containing the MCM assembly 100.

For this purpose, for example, a square hole of a size corresponding to the container 101 is formed at a portion of the bottom surface of the lower cap 190. A surface of the container 101 is inserted into the square hole and the container 101 is attached onto the bottom surface of the lower cap 190 detachably by screws 105. In FIG. 16, a part A' marked with a dashed dotted circle illustrates a part A marked with a dashed dotted line in the container 101, viewed from an arrowed direction. As noted from the part A', a gasket 103 formed of an appropriate material in an appropriate shape is formed at a contact portion between the container 101 and the bottom surface of the lower cap 190 in order to achieve more tight sealing.

To facilitate its repair and maintenance, the MCM assembly 100 may have an independent housing and be contained in the container 101. The MCM assembly 100 may be connected to the transmission line printed board 130 by the multi-line cable 104 having a multi-line connector at an end thereof.

As illustrated in FIG. 16, the DC/DC converter 30 may be installed along with the MCM assembly 100 inside the container 101.

Figure 17:
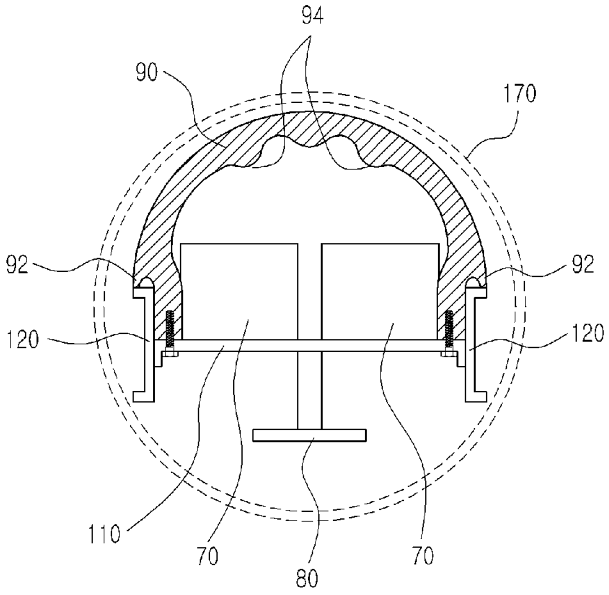
FIG. 17 is a schematic plan view of a protector and a related portion illustrated in FIG. 6.
Figure 18:
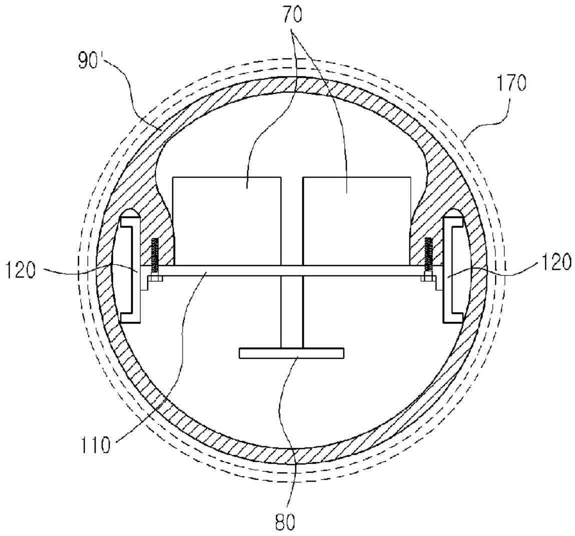
FIG. 18 is a schematic plan view of a protector and a related portion according to another exemplary embodiment of the present invention.

FIG. 17 is a schematic plan view of a protector and a related portion illustrated in FIG. 6 and FIG. 18 is a schematic plan view of a protector and a related portion according to another exemplary embodiment of the present invention.

Referring to FIGS. 17 and 18, a protector 90 according to an exemplary embodiment of the present invention is shaped into a semi-circular bar that surrounds the rear surface of the reflective plate 110, whereas a protector 90' according to another exemplary embodiment of the present invention may be shaped into a circle on the whole so that it surrounds board guide panels 120 and the frontal surface of the reflective plate 110 as well as the rear surface of the reflective plate 110. Accordingly, the protector 90' may protect the radiation elements 80 on the frontal surface of the reflective plate 110 as well as the reception signal amplification/division modules 70 on the rear surface of the reflective plate 110. While the circular protector 90' may be wholly integrated, it may formed by combining two semi-circular parts, for example, front and rear parts or left and right parts with a screw.

Aside from the above structure, the protector 90' may be shaped into a semi-circular bar to surround only the frontal surface of the reflective plate 110. Many other shapes as well as a semi-circle or a circle corresponding to the outer circumferential surface of the raydome 170 are available to the protector, including a square, a hexagon, etc.

While the protectors 90 and 90' are fixed onto the rear surface of the reflective plate 110 with screws in FIGS. 17 and 18, they may be configured so as to be fixed onto the frontal surface of the reflective plate 110 with screws.

Figure 19:
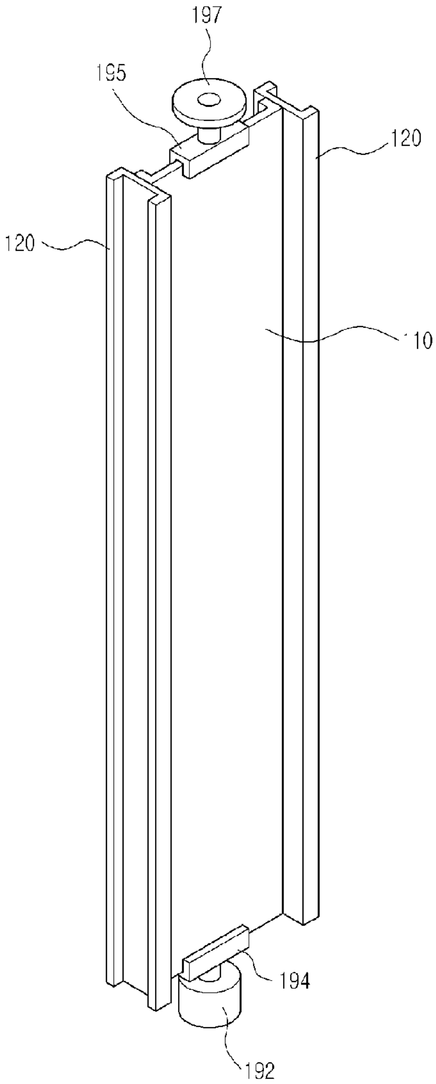
FIG. 19 is a perspective view of a reflective plate in the BS antenna according to an exemplary embodiment of the present invention, referred to for describing the rotation structure of the reflective plate.
Figure 20:
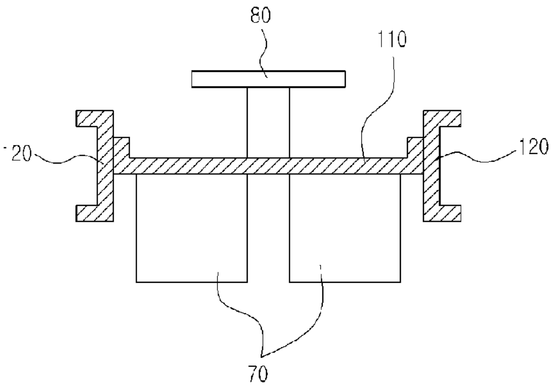
FIG. 20 is a plan view of the reflective plate and related devices illustrated in FIG. 19.

FIG. 19 is a perspective view of a reflective plate in the BS antenna according to an exemplary embodiment of the present invention, referred to for describing the rotation structure of the reflective plate and FIG. 20 is a plan view of the reflective plate and related devices illustrated in FIG. 19. The reflective plate is similar to that illustrated in FIGS. 6 and 7 in configuration.

Referring to FIGS. 19 and 20, the reflective plate 110 adjusts the radiation direction of an antenna beam as it rotates along with the rotation of the rotator 192 under the reflective plate 110, as described before with reference to FIGS. 6 and 7.

The reflective plate 110 is engaged with the rotator 192 under it and a hinge structure 197 above it by clamps 194 and 195, thus being supported up and down. In this structure of the reflective plate 110, especially when the reflective plate 110 is rotated by the rotator 192, it is vulnerable to the influence of bending. Since installation of various devices including a plurality of reception signal amplification/division modules 70 on the rear surface of the reflective plate 110 increases load on the reflective plate 110, the reflective plate 110 should be more robust in the present invention. To reinforce the strength of the reflective plate 110, elongated panels are provided as side wall portions 120 on side surfaces of the reflective plate 110, protruding forward and backward to a certain extent from the basic frame of the reflective plate 110. Accordingly, the overall plan structure of the reflective plate 110 is 'H' or 'H'-similar, as illustrated in FIGS. 19 and 20.

The side wall portions 120 functions to shield the devices including the reception signal amplification/division modules 70 on the rear surface of the reflective plate 110 against electronic waves emitted from the radiation elements on the frontal surface of the reflective plate 110 as well as to re-enforce the strength of the reflective plate 110. As described before with reference to FIGS. 6 and 7, the side wall portions 120 form a structure in which the transmission line printed board 130 can be installed for efficient wiring of transmission lines.

While these side wall portions 120 may be fabricated separately from the basic frame of the reflective plate 110 with the radiation elements 80 formed thereon and then engaged with it by screwing or welding, as illustrated in FIGS. 19 and 20, the side wall portions 120 may be integrated with the basic frame of the reflective plate 110 by an extrusion process. Also, both ends of each of the side wall portions 120 may be bent in the shape of '¬' to thereby enhance the strength re-enforcement and electronic wave shielding function, as illustrated in FIGS. 19 and 20.

Figure 21:
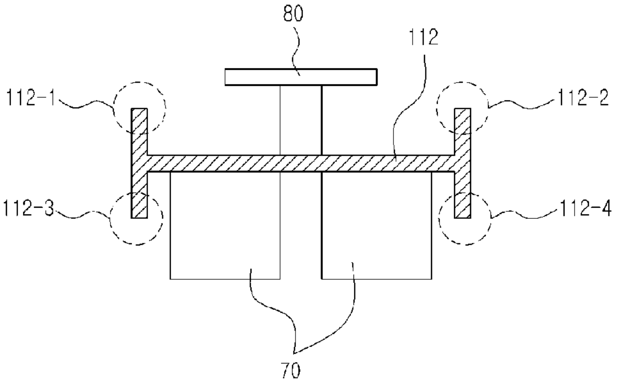
FIG. 21 is a plan view of a reflective plate and related devices according to another exemplary embodiment of the present invention.

FIG. 21 is a plan view of a reflective plate and related devices according to another exemplary embodiment of the present invention. A reflective plate 112 illustrated in FIG. 21 is similar to that illustrated in FIGS. 19 and 20 in structure, except that first and second side walls 112-1 and 112-2 protruding forward on the left and right surfaces of the reflective plate 112 and third and fourth sidewalls 112-3 and 112-4 protruding backward on the left and right surfaces of the reflective plate 112 are integrally formed.

Figure 22:
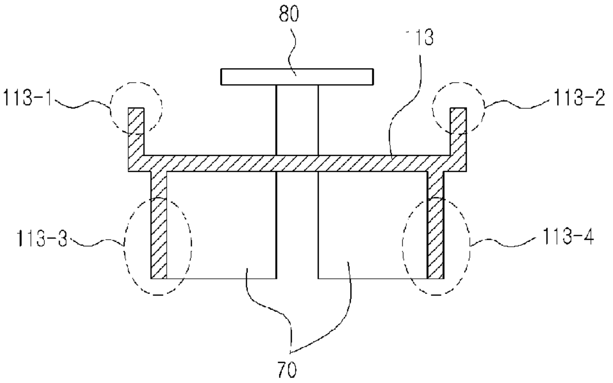
FIG. 22 is a plan view of a reflective plate and related devices according to another exemplary embodiment of the present invention.

FIG. 22 is a plan view of a reflective plate and related devices according to another exemplary embodiment of the present invention. A reflective plate 113 illustrated in FIG. 22 is similar to that illustrated in FIG. 21 in structure, in that first and second side walls 113-1 and 113-2 protrude forward from the left and right surfaces of the reflective plate 113 and third and fourth sidewalls 113-3 and 113-4 protrude backward from the left and right surfaces of the reflective plate 113. On the other hand, the reflective plate 113 is different from that illustrated in FIG. 21, in that the third and fourth side walls 113-3 and 113-4 are installed apart from both side ends of the rear surface of the reflective plate 110 by a predetermined distance, rather than in contact with the rear surface of the reflective plate 110.

Figure 23:
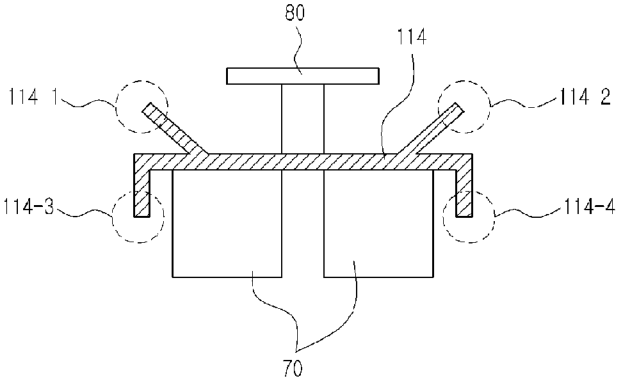
FIG. 23 is a plan view of a reflective plate and related devices according to a further exemplary embodiment of the present invention.

FIG. 23 is a plan view of a reflective plate and related devices according to a further exemplary embodiment of the present invention. A reflective plate 114 illustrated in FIG. 23 is similar to that illustrated in FIG. 21 in structure, in that first and second side walls 114-1 and 114-2 protrude forward from the left and right surfaces of the reflective plate 114 and third and fourth sidewalls 114-3 and 114-4 protrude backward from the left and right surfaces of the reflective plate 114. On the other hand, the reflective plate 114 is different from that illustrated in FIG. 21, in that the first and second side walls 114-1 and 114-2 are installed apart from both side ends of the rear surface of the reflective plate 114 by a predetermined distance, rather than in contact with the frontal surface of the reflective plate 114. With respect to the frontal surface of the reflective plate 114, the first and second side walls 114-1 and 114-2 are slanted, not perpendicular.

As illustrated in FIGS. 19 to 23, various embodiments may be implemented regarding the shapes of the side walls of the reflective plate. Aside from the above-described embodiments, the positions and inclinations of the sidewalls protruding forward and backward from the reflective plate may vary. The transmission line printed broad 130 may be installed on either of forward and backward sidewalls of the reflective plate.

A BS antenna for a mobile communication system can be implemented according to exemplary embodiments of the present invention as described above. While the invention has been shown and described with reference to certain exemplary embodiments of the present invention thereof, modifications can be made within the scope of the present invention. For example, while it has been described with reference to FIG. 2 that there are a total of eight radiation elements, the present invention is applicable to an antenna with any other number of radiation elements.

While it has been described above that one reception signal amplifier 72 is provided for every pair of radiation elements connected via an antenna front-end divider 74, one reception signal amplifier may be provided per radiation element.

While it has been described above that each reception signal amplifier 72 includes one LNA, it may further be contemplated that each reception signal amplifier may further include one or more redundant LNAs to flexibly cope with malfunction of an LNA. In this case, an additional switch may be used to connect paths to the redundant LNAs and the MCM may monitor the performance of each LNA and provide a switching control signal to the additional switch.

Therefore, it will be understood by those skilled in the art that various changes in form and details may be made therein without departing from the spirit and scope of the present invention as defined by the appended claims and their equivalents.

The invention claimed is:

1. A Base Station (BS) antenna in a mobile communication system, comprising:

a reflective plate with first and second side walls protruding forward on left and right surfaces of the reflective plate;

at least one radiation element installed on a front surface of the reflective plate; and a reception signal amplifier installed per at least one radiation element at a position corresponding to the at least one radiation element of the BS antenna, for amplifying an uplink signal received from the at least one radiation element;

wherein, the reception signal amplifier is installed at a position corresponding to the at least one radiation element on a rear surface of the reflective plate.

2. The BS antenna of claim 1, wherein the reception signal amplifier transmits a transmission downlink signal to the at least one radiation element according to a switching control signal and comprises:

a first switch for switching to a transmission or reception path according to the switching control signal;

a second switch connected to the at least one radiation element, for switching to the transmission or reception path according to the switching control signal;

a band pass filter for receiving a signal from the second switch and passing a signal in a predetermined frequency band during reception; and a low noise amplifier for low-noise amplifying a signal received from the band pass filter and outputting the amplified signal to the first switch.

3. The BS antenna of claim 2, further comprising a bypass switch connected to the low noise amplifier in parallel, for forming a bypass path in which the low noise amplifier is bypassed.

4. The BS antenna of claim 2, further comprising:

at least one redundant low noise amplifier connected to the low noise amplifier in parallel; and a switch for forming a path between the low noise amplifier and the at least one redundant low noise amplifier.

5. The BS antenna of claim 2, further comprising:

a signal separator for separating a Radio Frequency (RF) signal, a control signal for antenna control, and an operation power received in combination from a Base Transceiver Station (BTS);

a division/phase shift module for dividing the RF signal received from the signal separator at a division ratio of 1:N, shifting the phase of the divided signals according to a phase control signal, and outputting the phase-shifted signals to the reception signal amplifier;

a coupler for generating a signal coupled with the signals in combination received from the BTS or a signal separated by the signal separator in an RF path;

an RF detector for detecting an RF signal from the coupled signal received from the coupler;

a converter for receiving the separated operation power from the signal separator and providing the operation power to the reception signal amplifier; and a main control module for receiving the separated control signal and operation power from the signal separator, monitoring the status of the RF signal received from the RF detector, and outputting the phase control signal and the switching control signal according to the status of the RF signal.

6. The BS antenna of claim 1, wherein the reception signal amplifier transmits a transmission downlink signal to the at least one radiation element according to a switching control signal and comprises:

a first switch for switching to a transmission or reception path according to the switching control signal;

a band pass filter connected to the at least one radiation element, for passing a signal in predetermined transmission and reception frequency bands;

a second switch connected to the band pass filter, for switching to the transmission or reception path according to the switching control signal; and a low noise amplifier for low-noise amplifying a signal received from the second switch and outputting the amplified signal to the first switch during reception.

7. The BS antenna of claim 1, wherein the reception signal amplifier transmits a transmission downlink signal to the at least one radiation element in Frequency Division Duplex (FDD) and comprises:

first and second duplexers for separating a transmission path from a reception path; and a low noise amplifier installed in a reception path between the first and second duplexers, for amplifying a received signal.

8. The BS antenna of claim 1, wherein the reception signal amplifier transmits a transmission downlink signal to the at least one radiation element in Frequency Division Duplex (FDD) and comprises:

a transmission filter in a transmission path;

first and second reception filters in a reception path; and a low noise amplifier installed between the first and second reception filters, for amplifying a received signal.

9. The BS antenna of claim 1, further comprising an antenna-front end divider for connecting a reception signal amplifier to radiation elements mapped to the reception signal amplifier, if one reception signal amplifier is provided per two or more radiation elements.

10. The BS antenna of claim 1, further comprising an antenna-front end divider for connecting a reception signal amplifier to radiation elements mapped to the reception signal amplifier on a surface of the reflective plate with the reception signal amplifier installed thereon, if one reception signal amplifier is provided per two or more radiation elements.

11. The BS antenna of claim 10, wherein the antenna-front end divider is configured in the form of a Printed Circuit Board (PCB) having a transmission line pattern for a divider formed thereon, and ends of branched portions of the transmission line pattern are positioned in correspondence with connectors of connected radiation elements.

12. The BS antenna of claim 11, wherein the antenna-front end divider is attached on a side surface of the reception signal amplifier, and a combined portion of the transmission line pattern is at a position to be connected to a connector of the reception signal amplifier to which the transmission line pattern is attached.

13. The BS antenna of claim 1, wherein an exterior of the BS antenna is formed by a raydome having a top and a bottom capped with an upper cap and a lower cap, a plurality of devices including the radiation elements, the reflective plate, and the reception signal amplifier are installed within the raydome, and a main control module assembly for controlling operations of the BS antenna is installed in any one of the upper and lower caps.

14. The BS antenna of claim 13, wherein the main control module assembly has an independent housing to facilitate repair and maintenance of the main control module assembly and the top of the upper cap is designed in the form of an easily opened and closed cover, so that the main control module assembly can be easily mounted and detached.

15. The BS antenna of claim 14, wherein the main control module assembly is fixed to the reflective plate directly or indirectly to rotate along with a rotation for adjusting a radiation direction of an antenna beam from the reflective plate.

16. The BS antenna of claim 13, wherein at least part of transmission lines for transmitting a control signal to control operations from the main control module assembly are provided through a PCB-based transmission line printed board, and the transmission line printed board is attached onto a side surface of the reflective plate directly or through a board guide panel.

17. The BS antenna of 16, wherein a final connection is made between the transmission line printed board and the main control module assembly by a multi-line cable with a multi-line connector at an end thereof.

18. The BS antenna of claim 13, wherein a hole of a predetermined shape is formed on a portion of the bottom surface of the lower cap and a converter is installed detachably in the hole, to provide the operation power to the reception signal amplifier.

19. The BS antenna of claim 1, wherein a box-type container is detachably attached on a bottom surface of the lower cap and the main control module assembly is contained in the container.

20. The BS antenna of claim 1, further comprising:

a raydome forming an exterior of the BS antenna;

upper and lower caps capping a top and a bottom of the raydome, respectively; and a main control module assembly for controlling operations of the BS antenna;

wherein the main control module assembly is installed detachably in any one of the upper and lower caps.

* * * * *